United States Patent [19]

Parkhurst et al.

[11] Patent Number: 4,694,159
[45] Date of Patent: Sep. 15, 1987

[54] OPTIC SENSOR WITH REFERENCE AND DETECTING OPTIC CIRCUITS

[75] Inventors: Larry E. Parkhurst, Boulder; Michael R. Meadows, Nederland, both of Colo.

[73] Assignee: Dieterich Standard Corporation, Boulder, Colo.

[21] Appl. No.: 899,013

[22] Filed: Aug. 22, 1986

Related U.S. Application Data

[63] Continuation of Ser. No. 617,889, Jun. 6, 1984.

[51] Int. Cl.[4] ............................................. H01J 5/16
[52] U.S. Cl. ................................. 250/227; 250/231 R
[58] Field of Search ............... 250/227, 231 R, 231 P; 73/705

[56] References Cited

U.S. PATENT DOCUMENTS

| 3,327,584 | 6/1967 | Kissinger | 356/212 |
| 3,580,082 | 5/1971 | Strack | 73/406 |
| 3,786,238 | 1/1975 | Heisner | 250/227 |
| 3,961,185 | 6/1976 | Brokenshire | 250/231 R |
| 4,071,753 | 1/1978 | Fulenwider | 250/227 |
| 4,158,310 | 6/1979 | Ho | 73/705 |
| 4,249,076 | 2/1981 | Bergstron | 250/227 |
| 4,293,188 | 10/1981 | McMahon | 350/96.29 |
| 4,310,905 | 1/1982 | Palmer | 367/140 |
| 4,313,185 | 1/1982 | Chovan | 367/149 |
| 4,322,978 | 4/1982 | Fromm | 73/705 |
| 4,356,396 | 10/1982 | Ruell et al. | 250/227 |
| 4,358,960 | 11/1982 | Porter | 250/227 |
| 4,428,239 | 1/1984 | Johnston | 73/705 |
| 4,472,022 | 9/1984 | Bearcroft et al. | 73/705 |
| 4,487,206 | 12/1984 | Aagard | 73/705 |
| 4,543,831 | 10/1985 | Meyer | 73/705 |

OTHER PUBLICATIONS

Cuomo, "Optical Level Hydrophones", Proc. of Spie 412, 1983.

Primary Examiner—David C. Nelms
Attorney, Agent, or Firm—Kerkam, Stowell Kondracki & Clarke

[57] ABSTRACT

An optic displacement sensor includes first and second optic circuits which optic circuits include di-directional means for a light supply path to and a light return path from a light reflecting surface means. The first optic circuit is a reference signal circuit, and the second optic circuit is a measuring signal circuit. Means are provided for directing light into the light supply paths for the pair of optic circuits, and means are provided whereby the light from the light supply paths of the pair of optic circuits is received by light reflecting means and at least partially reflected into the light return paths where it is detected. Further, the sensor includes means for adjusting the detected signal from one of the light return paths with respect to the detected light from the other light return path.

1 Claim, 28 Drawing Figures

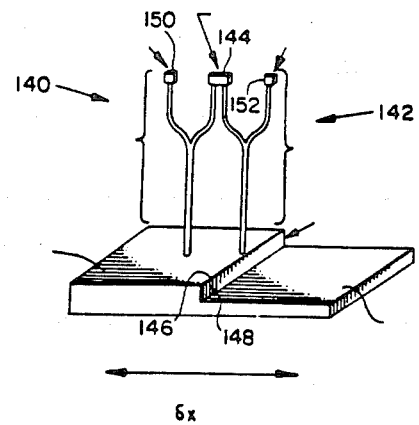
FIG. 9.
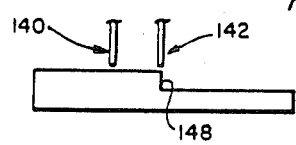
FIG. 9a.
FIG. 10.
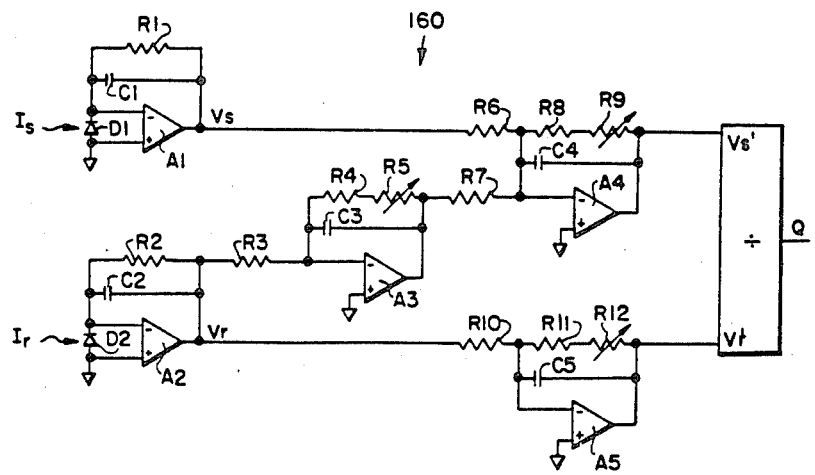

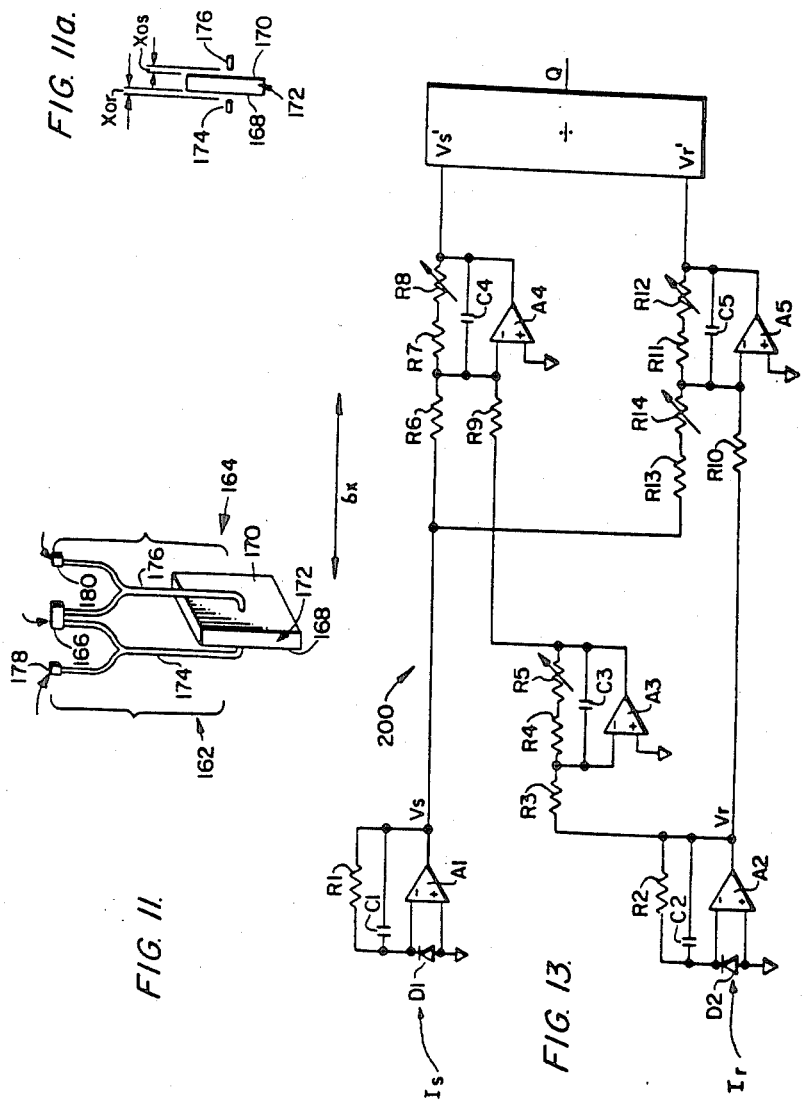

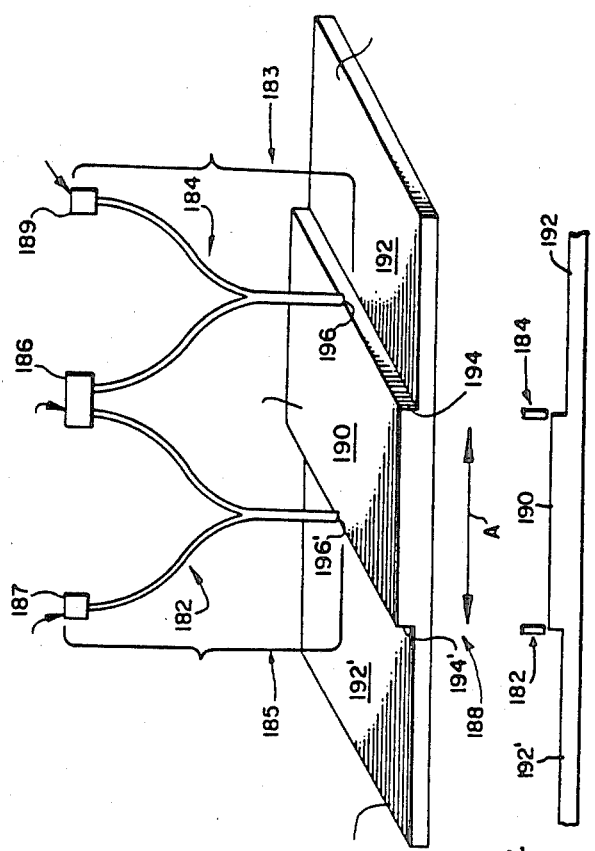

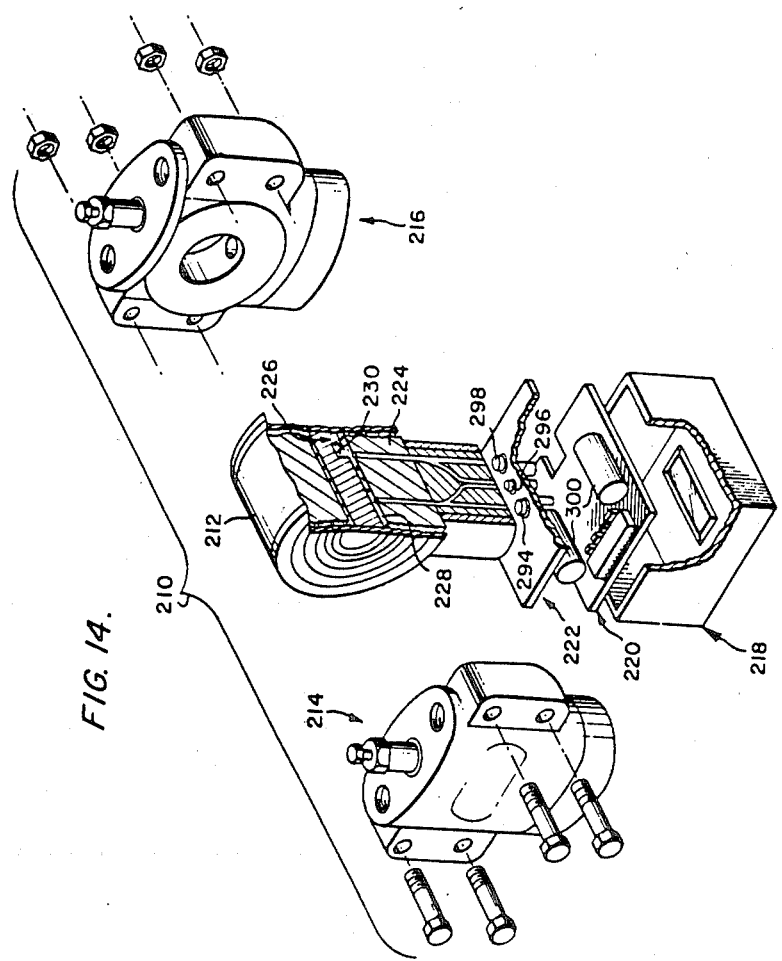

OPTIC SENSOR WITH REFERENCE AND DETECTING OPTIC CIRCUITS

This is a continuation of application Ser. No. 617,889, filed June 6, 1984.

BRIEF SUMMARY OF THE INVENTION

The present invention provides an improvement in the performance of a class of optical displacement sensors. There are many members of the class, but all conduct light from a light source to a mirror-like surface using one or more optical waveguides. The light leaves the waveguide(s) and propagates to the mirror where it is reflected and returns to the end(s) of the waveguide(s). A portion of the light then re-enters the same or other waveguide(s) and is conducted to a photodetector which measures the radiant power returned. Sensor action occurs because the amount of light returned in the waveguide(s) depends on the position of the mirror relative to the proximal end(s) of the waveguide(s).

All the members of this class of sensors have several common deficiencies. They all measure radiant power and infer a displacement, so they all will produce erroneous inferences if the radiant power of the light source changes from its calibration value. They will also all produce erroneous inferences if variations in ambient conditions such as temperature or pressure cause a change in the relative position of the mirror and waveguide(s) independently of the displacement to be measured. Other potential causes of erroneous measurements exist and some of these are discussed below.

The improvement provided by this invention resides in two methods of reducing or eliminating the effects of several sources of error.

The present invention may be generally defined as an optic sensor comprising first and second optic circuits and a light reflecting means. The first and second optic circuits provide bi-directional means for a light supply path to and a light return path from the reflecting surface. The first optic circuit is a reference signal circuit and the second optic circuit comprises a measuring signal circuit. There are means for directing light into the light supply paths of the first and second optic circuits from a single light source. Mounting means are provided such that light from the light supply paths of the first and second optic circuits is received by the reflector and at least partially reflected into the light return paths of the first and second optic circuits. Further detector means are provided for each light return path of the first and second optic circuits, and there are means for adjusting the measuring signal with respect to the reference signal.

BRIEF DESCRIPTION OF THE DRAWING

The invention will be more particularly described in reference to the accompanying drawings wherein:

FIG. 8 is a perspective and diagrammatic view of a fixed referencing means for an optical sensor as illustrated in FIGS. 1 and 1a;

FIG. 9 is a diagrammatic perspective view of a fixed referencing means for the sensor illustrated in FIGS. 2 and 2a;

FIG. 9a is a fragmentary end view of the structures shown in FIG. 9;

FIG. 10 illustrates suitable fixed referencing electronics for the optic sensor;

FIG. 11 is a perspective view of a complementary referencing means for an optic sensor as illustrated in FIGS. 1 and 1a;

FIG. 11a is a fragmentary end view of the structures shown in FIG. 11;

FIG. 12 is a perspective view of another form of complementary referencing for an optic sensor as illustrated in FIGS. 2 and 2a;

FIG. 12a is a fragmentary end view of the structures shown in FIG. 12;

FIG. 13 is an electronic diagram of complementary referencing electronics for the optic sensors of the invention;

FIG. 14 is an exploded perspective view of one form of sensor of the invention;

DESCRIPTION OF FIRST OPTICAL DISPLACEMENT SENSOR

Figure 1:
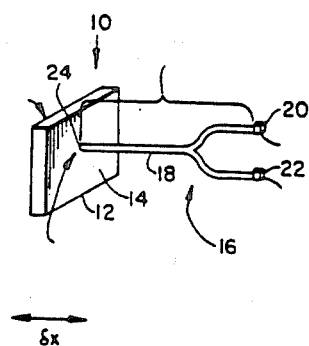
FIG. 1 is a diagrammatic perspective view of an optical displacement sensor.

Referring to FIG. 1, there is shown the components of a first optical displacement sensor type 10 and their configuration. There are several ways of implementing this sensor which will be described hereinafter.

The first major component consists of a material 12 having a portion of at least one of its surfaces 14 nominally plane and of high reflectance. This component functions as a mirror.

The second major component is an optic circuit 16. It consists of three minor components: a waveguide circuit 18; a light source 20 and an opto-electric transducer (e.g. a photodetector) 22. The function of the waveguide 18 is to ensure that light injected into the waveguide by the light source 20 will propagate to the sensing end 24. It also assures that at least some of the reflected light entering the sensing end 24 will propagate to the photodetector 22. The waveguide circuit 18 can consist of one or more individual waveguides.

The sensing end 24 is usually prepared so that the end(s) of the waveguide(s) is(are) a smooth plane perpendicular to the light's direction of propagation in the waveguide circuit. The sensing end is placed in proximity to the mirror. Many variable waveguide parameters determine the gap between the sensing end and the mirror or reflecting surface. In general the gap would be from about 0.015 to about 0.400 mm.

This relative placement of the sensing end and the mirror 14 enables the system to sense displacements of the mirror in the following way. Light is injected into the waveguide circuit 18 so that it propagates toward the sensing end. Upon reaching this end, the light leaves the waveguide circuit and propagates toward the mirror 14 in a diverging beam. A fraction of the light reaching the mirror is reflected and returns toward the sensing end 24. When it reaches the sensing end, the diverging light has spread out, so that only a portion of it can re-enter the waveguide circuit 18. Thus, the fraction of the light injected into the waveguide circuit which re-enters the waveguide circuit depends on the amount of beam spreading which depends on the distance between the mirror and the sensing end. The relative separation thus modulates the intensity of the light returned to the photo detector 22 thus enabling it to be calibrated as a measurement of mirror displacements.

The sensor action of the arrangement can be described mathematically in the following way. Let the radiant power of the light emerging from the sensing end 24 be denoted by $I^+$ and the reflectance of the mirror by R. Further, let x be the distance between the sensing end and the mirror, and let t be the round trip fraction of the radiant power which is transmitted through the medium occupying the gap between the sensing end and the mirror. Now the dependence of the power re-entering the waveguide circuit on this distance is generally a complicated function g(x). Several waveguide parameters such as numerical aperture and dimensions are contained in g. With this notation the radiant power, $I'$, re-entering the waveguide circuit is $$I' = t\, R\, I^+ g(x).$$

Figure 1A:
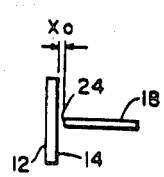
FIG. 1a is an end view of a portion of the structure shown in FIG. 1.

This is a description of the sensor action which takes place between the sensing end and the mirror in FIGS. 1 and 1a. The complete sensor requires that the light be conducted to and from the sensing end, so that a quantity proportional to $I'$ can be measured with the photodetector 22. The waveguide circuit performs this task with the result that the light, $I^+$, emerging from the sensing end is proportional to the output $I_o$ of the light source modified by a factor, p, representing effects of the circuit such as the fraction of $I_o$ injected into the waveguide and losses due to absorption, scattering, reflection and mode conversion. $I'$ is similarly modified on the return trip to the photodetector. If this modification is represented by the factor q, then the light signal presented to the detector 22 is $$I = q\, t\, R\, p\, I_o\, g(x_o + \delta x), \qquad \text{Eq. 1}$$

where $x_o + \delta x = x$ has been substituted to explicitly display the displacement $\delta x$ to be measured. This result shows that the intensity of light falling on the photodetector can be calibrated to provide a measure of the displacement, $\delta x$, relative to the initial position, $x_o$.

It is readily apparent from Equation 1 that other factors besides the displacement will affect the radiant power falling on the photo detector. Any changes in the waveguide circuit factors p or q, or changes in the gap transmittance, t, or changes in the reflectance of the mirror, or variations in the output of the light source from any cause whatsoever will produce changes in I which are indistinguishable from changes due to variations in $\delta x$. These potential sources of error can be very serious in practical applications and cause the sensor to be unreliable and need frequent recalibration.

The displacement to be measured can be produced in many ways. The referencing methods which are an improvement of this invention apply to all of them. An example is provided by a pressure sensor. In this case the pressure could be sensed by an elastic diaphragm, supported around its periphery. Such a diaphragm deflects elastically when there is a difference in the pressure applied to its two faces. This difference in pressure which is to be measured causes the center of the diaphragm to move relative to the periphery. The diaphragm is made so that its center has high specular reflectance, and the optic sensing end is located in proximity to the diaphragm's center as described above, but it is fixed relative to the periphery so the motion of the diaphragm displaces the center relative to the sensing end of the waveguide circuit. This arrangement is appropriate for sensing a pressure difference impressed on the diaphragm.

DESCRIPTION OF A SECOND OPTICAL DISPLACEMENT SENSOR

Figure 2:
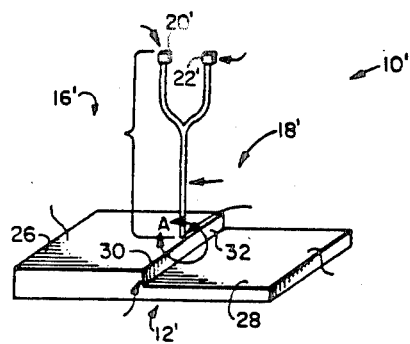
FIG. 2 is a diagrammatic perspective view of another form of optical displacement sensor.
Figure 2A:
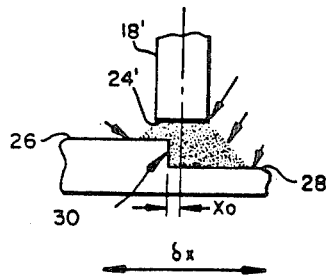
FIG. 2a is a fragmentary end view of the sensor shown in FIG. 2.

FIGS. 2 and 2a show the components of a second optical displacement sensor type 10' and their configuration. There are several ways of implementing this sensor which will be described below.

The first major component consists of a material 12' having a first, nearly plane surface of high specular reflectance 26. This component serves as a mirror. The component also has a second surface 28 located so that there is a boundary region 30 between the two surfaces 26 and 28. FIGS. 2 and 2a show the two surfaces 26 and 28 both nominally plane and mutually parallel and joined by a step or boundary 30 having a face 32 oriented at right angles to both. Other implementations of this component are possible in which these aspects are different. In particular, the height of the step 30, the shape and orientation of the boundary separating the two surfaces, and the reflectance of the second surface 28 can vary widely.

The second major component is an optic circuit 16'. It consists of three minor components: a waveguide circuit 18'; a light source 20'; and a photodetector 22'. The function of the waveguide circuit is to ensure that light injected into the waveguide circuit by the light source will propagate to the optical sensing end 24'. It also assures that at least some of the light entering the optical sensing end will propagate to the photodetector 22'. The waveguide circuit 18' can consist of one or more individual optical waveguides.

The sensing end 24' is usually prepared so that the end(s) of the waveguide(s) is(are) a smooth plane perpendicular to the light's direction of propagation in the waveguide(s). This sensing end is then located close to the first surface of the stepped mirror with the end(s) of the waveguide(s) parallel to it. The edge 30 of the step generally intersects the cross-section of the sensing end projected to the plane of the first surface 26 along the axis of waveguide symmetry.

The operation of the sensor is based on the following use of the components. Light from the source 20' is injected into the waveguide circuit 18' and propagates within it toward the sensing end 24'. When the light reaches the sensing end, most of it emerges from the waveguide circuit and propagates toward the stepped mirror in a diverging beam. Consider two cases. In the first case, the entire cross-section of the diverging beam falls on the first surface 26 of the stepped mirror. Then a fraction governed by the mirror reflectance is returned toward the sensing end. On its return, the diverging light beam has spread out over the round trip distance between the sensing end and the mirror. Thus, only a portion of the light which emerged from the sensing end again falls on the sensing end, re-enters the waveguide circuit, and propagates toward the photodetector 22'. In the second case, the entire cross-section of the diverging beam falls on the second surface 28 of the stepped mirror. Then the light will have diverged more than it did in the first case, since the round trip distance between sensing end and mirror is greater than in the first case. Consequently the amount of light which can re-enter the waveguide circuit and propagate toward the photodetector is less than in the first case. The amount of light in the second case is further modified relative to the first case if the shape or orientation of the second surface differs from those of the first surface or if the reflectance of the second surface is not equal to that of the first surface. If, for example, the height of the step were very small, or even nonexistant, but the reflectance of the second surface were different from that of the first surface, then the reflectance would become the dominant factor modulating the amount of light reentering the waveguide(s). This situation would provide the basis for sensor action, too. The term "step" can then be a literal step as shown in the figures or it can be taken figuratively to describe other means of changing the light intensity returned by the second surface relative to the first surface.

Now consider the case in which the edge 30 of the step intersects the diverging beam from the sensing end 24'. That part of the beam falling on the first surface 26 will be returned to the sensing end as in the first case. That part of the diverging beam falling on the second surface will be returned to the sensing end as in the second case. The total amount of light re-entering the waveguide circuit 18' will then be intermediate between the first and second cases and will depend on the position of the edge 30 within the diverging beam. Thus the light propagating toward the photo detector 22' will vary continuously from the value of the first case to the value of the second case as the edge transits the beam of light. Consequently, a measurement of the radiant power returned to the photodetector can be calibrated as a measurement of the position of the edge 30 relative to the sensing end 24'. This assumes that the displacements are nearly parallel to the first surface.

The sensor action of the arrangement can be described mathematically with the following simplified model. Let the radiant power of the light emerging from the fiber optic sensing end 24' be denoted by $I^+$ and the reflectance of the first surface 26 by R. Let t be the round trip fraction of radiant power which is transmitted through the medium occupying the space between the sensing end and the first surface. Further, let x be the shortest distance from the edge of the step to the center of the diverging beam. Now the power returned to the waveguide circuit 18' is generally a complicated function of x. Let this be represented by h(x), where h also incorporates, but is not limited to, parameters such as the waveguide demensions and numerical aperature as well as the reflectance of the second surface 28, the nominal distance between the sensing end 24' and the first surface 26 and the height of the step. Then the radiant power, I', returned to the waveguide circuit is $$I' = t\, R\, I^+ h(x).$$

The complete sensor also requires that the light be conducted to and from the sensing end so that a quantity proportional to I' can be measured with the photodetector 22'. The waveguide circuit 18' performs this task with the result that the light, $I^+$, emerging from the sensing end is proportional to the output, $I_o$, of the light source 20' modified by a factor p which represents the effects of the circuit such as the fraction of $I_o$ injected into the waveguide circuit and the losses due to absorption, scattering, reflection and mode conversion. I' is similarly modified by the circuit on its return trip to the photodetector. If this modification is denoted by the factor q, then the light signal provided to the detector is $$I = q\, t\, R\, p\, I_o\, h(x_o + \delta x). \qquad \text{Eq. 2}$$

where $x_o + \delta x = x$ has been substituted to explicitly display the displacement $\delta x$ to be measured. This result shows that the intensity of light delivered to the photodetector can be calibrated to provide a measure of $\delta x$, relative to the initial separation, $x_o$.

It is apparent from Equation 2 that other factors besides the displacement will affect the radiant power falling on the photo detector. Any changes in the waveguide circuit factors p or q, or changes in the gap transmittance, t, or changes in the reflectance of the mirror, or variations in the output of the light source from any cause whatsoever will produce changes in I which are indistinguishable from changes due to variations in $\delta x$. These potential sources of error can be very serious in practical applications and cause the sensor to be unreliable and need frequent recalibration.

The displacement to be measured can be produced in many ways. The referencing methods which are an improvement of this invention apply to all of them. An example is provided by a pressure sensor. In this case the pressure could be sensed by an elastic diaphragm, supported around its periphery as to be described in detail in reference to FIGS. 14-21. Such a diaphragm deflects elastically when there is a difference in the pressure applied to its two faces. This difference in pressure which is to be measured causes the center of the diaphragm to move relative to the periphery. The stepped mirror is then attached to the center of the diaphragm, so that the step also moves relative to the periphery when the pressures are applied. The optic sensing end is located in proximity to the step as described above, but is fixed relative to the periphery so the motion of the diaphragm displaces the step relative to the sensing end of the waveguide circuit. This arrangement is appropriate for sensing a pressure difference impressed on the diaphragm.

Description of Several Implementations of the Components of the Optical Displacement Sensors From the foregoing descriptions it is seen that the mirrors for the two forms of sensor FIGS. 1 and 1a and 2 and 2a must fulfill quite different criteria. The other components of the two systems fulfill the same criteria and will be discussed without specific reference to either example system. It is also clear that the power returned to the photodetector by the waveguide circuit has a similar expression for the two example sensors. The only difference is in the details of the functions g(x) and h(x) in Equations 1 and 2. If the notation f(x) is used to refer to g(x) or h(x), then the mathematical expression $$I = p \, c \, t \, r \, I_0 f(x_0 + \delta x) \qquad \text{Eq. 3}$$

can be used to simultaneously describe both example sensors.

The light source 20 or 20' can be implemented with, but is not limited to, an incandescent bulb, a gas discharge tube, a gas laser, a solid state light emitting diode or a diode laser.

The function of the photodetector 22 or 22' (e.g., an opto-electric transducer) is to convert variations in incident light into variations in some electrical quantity. Thus the photodetector can be implemented with, but is not limited to, devices utilizing the photovoltaic, photoconductive and photoemissive effects. Examples of such devices include but are not limited to silicon and germanium photodiodes, cadmium selenide, cadmium sulphide, lead sulphide and lead selenide photoconductive cells, indium arsenide and indium antimonide photovoltaic cells, vacuum photodiodes and photomultiplier devices.

The function of the waveguide circuit 18 or 18' is to provide for the propagation of light between the various other components and to provide for fabrication of the optic sensing end. As such, a variety of materials and material forms can be used. Four waveguide circuits of particular interest are: the waveguide consisting of single optical fibers which are made into a circuit by being joined at a fiber tap or coupler FIGS. 3 and 3a; the waveguide consisting of a channel or rib waveguide on or in an integrated optic substrate FIG. 4; the waveguides consisting of two or more optical fibers which are not joined by a fiber tap or coupler FIGS. 5 and 6; the circuit fabricated with different portions of it consisting of different kinds of waveguide(s) FIG. 7.

Figure 3:
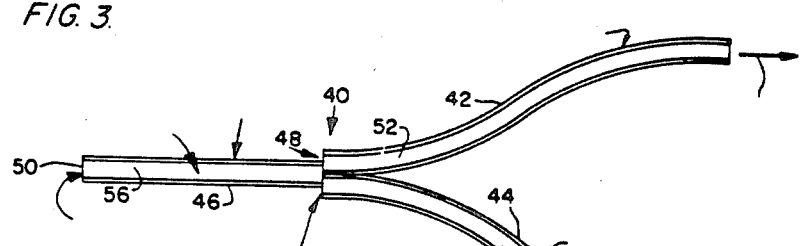
FIG. 3 is a diagrammatic, greatly enlarged view of a waveguide circuit consisting of single optical fibers.

FIG. 3 shows a waveguide circuit 40 consisting of single optical fibers 42, 44, and 46. The individual optical fibers may have similar or differing dimensions and optical properties. The light from the light source is injected into a single fiber 44, and the photodetector receives light from a single fiber 42. These two fibers are disposed so that they transfer their light to and from a third single fiber 46 at a tap or coupler 48. The free end 50 of the third single fiber 46 is the optical sensing end which is placed near the mirror. There are many ways of fabricating the tap so that it accomplishes its function. FIG. 3 shows a tap 48 which is fabricated by fusing or gluing the three fibers together in a butt joint. Other methods for fabricating the tap exist. These are described in the literature and, therefore, need not be repeated here. The essential ingredient is that the tap provide that light propagating in the core 52, 54, or 56 of a particular fiber be coupled to the core of an appropriate other fiber. This form of waveguide circuit can then be joined with the other components to produce an optical displacement sensor.

Figure 3A:
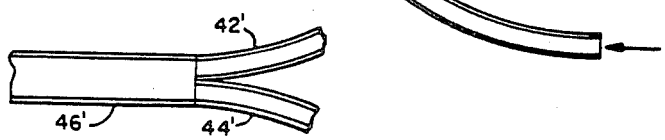
FIG. 3a is a diagrammatic, greatly enlarged view of a waveguide similar to the waveguide shown in FIG. 3.

FIG. 3a shows a waveguide circuit of the type shown in FIG. 3, except that the diameter of fiber 46' is larger than fibers' 42' and 44' diameters.

Figure 4:
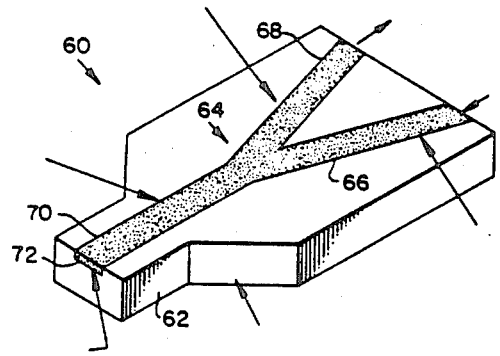
FIG. 4 is a view like FIG. 3 of another form of waveguide circuit consisting of an integrated optic device.

FIG. 4 shows a waveguide circuit 60 consisting of an integrated optic device. This implementation requires that waveguides be produced in or on the substrate 62 by one of the many methods which appear in the literature. The waveguides must be configured with a branch 64 so that the light source and photodetector have separate branches 66 and 68. The remaining waveguide branch 70 terminates in the optical sensing end 72. This form of waveguide circuit can then be joined with the other components to produce an optical displacement sensor.

Figure 5:
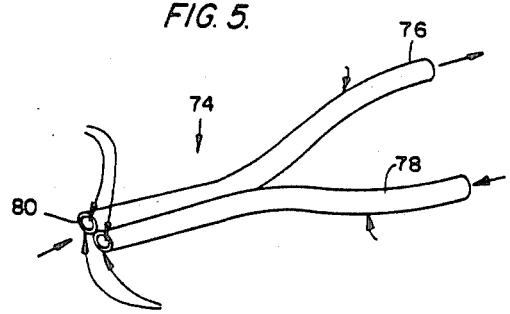
FIG. 5 is a perspective view of another waveguide circuit consisting of two optical fibers.

FIG. 5 shows a waveguide circuit 74 consisting of two optical fibers 76 and 78. One of the fibers 78 receives the light from the light source and carries it to the optical sensing end 80. The second fiber 76 receives the light reflected from the mirror and conducts it to the photodetector. This form of waveguide circuit can be joined with the other components to produce an optical displacement sensor.

Figure 6:
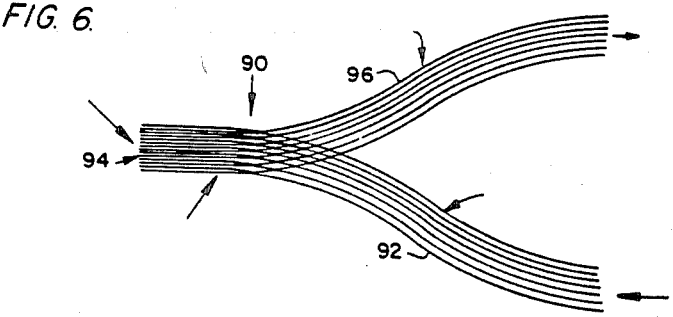
FIG. 6 is a diagrammatic view of a further waveguide circuit consisting of a plurality of optical fibers.

FIG. 6 shows a wave guide circuit 90 consisting of many optical fibers. The fibers are divided into two groups. One group 92 receives light from the light source and conducts it to the optical sensing end 94. The second group 96 receives the light reflected from the mirror and conducts it to the photodetector. At the optical sensing end the fibers of the two groups can be segregated in various ways or the individual fibers of the two groups can be interspersed randomly. These different distributions will provide different response functions f(x). This form of waveguide circuit can be joined with the other components to produce an optical displacement sensor.

Figure 7:
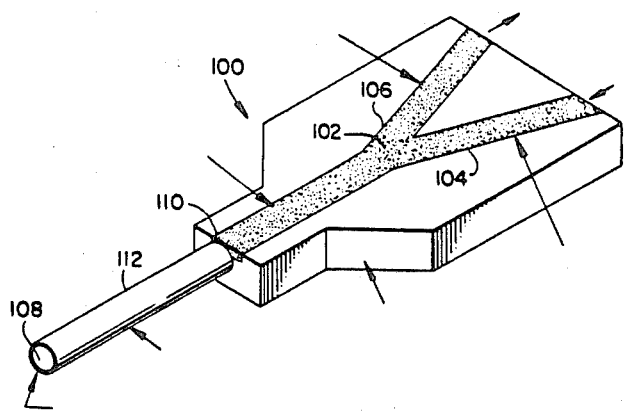
FIG. 7 is a perspective view of a hybrid-type waveguide circuit.

It is also possible to fabricate a hybrid waveguide circuit using different methods for different parts of it. FIG. 7 shows one example in which an integrated optic device 100 is used to provide a branch 102 and waveguides leading to the light source and the photodetector 104 and 106. The integrated optic waveguide does not extend to the optical sensing end 108, but terminates at a joint 110 with an optical fiber 112 which extends from the integrated optic device 100 to the optical sensing end 108. This form of waveguide circuit can be joined with the other components to produce an optical displacement sensor.

Description of Fixed Referencing

Fixed referencing for eliminating or reducing the effects of several sources of error is applicable to the entire class of displacement sensors of the invention. The method uses a second optic circuit, called the reference circuit, which is employed in such a manner that it senses the errors due to, but not limited to, the sources mentioned above. The reference circuit is employed so that the displacement to be measured does not have any effect on its output. The first optic circuit, called the signal circuit, senses both the errors and the displacement to be measured. The referencing method uses the output of the reference circuit to compensate the output of the signal circuit. The compensated result is thereby greatly improved, since it contains the effects of the displacement while the effects of the sources of error are greatly reduced or eliminated.

Figure 8:
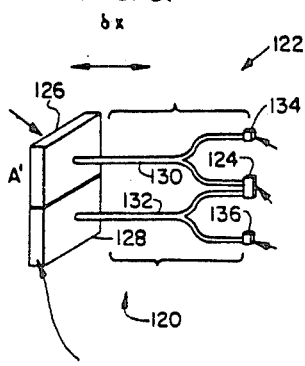
Figure 8A:
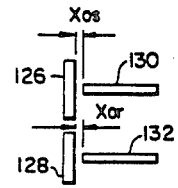
FIG. 8a is a fragmentary end view of the structures shown in FIG. 8.

An arrangement of the optic circuits which employs the fixed referencing method in a displacement sensor of the first type is shown in FIGS. 8 and 8a. The referencing circuit 120 is similar to the signal circuit 122, and they both use a common light source 124. The two circuits differ in that light from the signal circuit 122 reflects from a moving mirror 126, while the reference circuit 120 is located so that its light reflects from a separate, stationary mirror 128, or from a section of the moving mirror which is held stationary. This mirror might be, but is not limited to, an elastic diaphragm the movable center of which acts as a mirror for the signal circuit, while a section of the immobile periphery serves as a mirror for the reference circuit.

The system of FIG. 8 also includes a pair of waveguide circuits 130 and 132 each as shown for example in FIGS. 1 and 1a and a pair of photodetectors 134 and 136.

An arrangement of the optic circuits which employs the fixed referencing method in a displacement sensor of the second type is shown in FIG. 9. The referencing circuit 140 is similar to the signal circuit, and they both use a common light source 144. The two circuits differ in that light from the signal circuit 142 intercepts the edge 146 of the step 148, while the reference circuit 140 is located so that none of its light intercepts the edge 146 of the step 148, but instead reflects from another portion of the first surface or from a separate mirror with respect to which it is fixed.

Mathematical Treatment of Fixed Referencing

For both type sensors, the radiant power returned to the photodetectors 134 and 136, or 150 and 152 in each optic circuit is a modified version of Equation 3 in which the subscripts s and r refer to the signal and reference optic circuits 122 and 120, or 142 and 140, respectively. The radiant power falling on the photodetectors 134 and 136, or 150 and 152 is then $$I_s = P_s t_s R_s q_s I_o f_s(x_{os} + \delta x)$$

for the signal circuit and $$I_r = P_r t_r R_r g_r I_o f_r(x_{or})$$

for the reference circuit.

The referencing function is performed by treating $I_s$ and $I_r$ as numerical quantities and forming the ratio $$Q = K \frac{I_s - G I_r}{I_r} . \qquad \text{Eq. 4}$$

The quantities G and K are adjustable parameters which are used in the following way to calibrate the sensor. Let the values of the variables at the time of calibration be denoted with the superscript 0. Then G is set so that $Q = 0$ when $\delta x = 0$. G is thus a balance control which causes the signal and reference channels to cancel at the zero point. This requires that $$G = \frac{p°_s t°_s R°_s q°_s f_s(x°_{os})}{p°_r t°_r R°_r q°_r f_r(x°_{or})} .$$

The parameter K is set so that Q has the desired full scale value when $\delta x$ is at full scale. K is thus the system span control.

The result of this referencing procedure is that Q is now given by $$Q = K \frac{p_s}{p_r} \frac{t_s}{t_r} \frac{R_s}{R_r} \frac{q_s}{q_r} \frac{f_s(x_{os} + \delta x)}{f_r(x_{or})} - K G.$$

The great improvement that this referenced result represents over the unreferenced sensor can be appreciated with the following reasoning. The quantities represented by p, t, R and q can change slightly with time or with temperature or other environmental influences. These changes can be represented as a power series in the perturbing variable. For example, $$p_s = p°_s (1 + m \Delta T + n(\Delta T)^2 + \ldots)$$

where $\Delta T$ is temperature change relative to the temperature at the time of calibration and m and n are constants. Now $p_s$ and $p_r$ are both subject to the same form of perturbation. Moreover, the signal and reference wave guide circuits are similar with the consequence that the constants m and n (as well as the coefficients of the higher order terms in the expansion) are very closely matched. Thus, there is a large, useful range of temperature for which the ratio of the two power series is negligibly different from unity. This means that $p_s/p_r = p°_s/p°_r$. The same reasoning applies to other perturbing variables besides temperature. It also applies to the ratio of the gap transmittances $t_s/t_r$ and the ratio of the reflectances $R_s/R_r$ and the ratio of the other circuit modifying factors $q_s/q_r$. The result for Q is then $$Q = K \frac{p°_s}{p°_r} \frac{t°_s}{t°_r} \frac{R°_s}{R°_r} \frac{q°_s}{q°_r} \frac{f_s(x_{os} + \delta x)}{f_r(x_{or})} - K G.$$

This represents the final result of the fixed referencing method. The improvement is seen to be fourfold. First, the radiant power output, $I_o$, of the light source has been removed from the sensor output. This means that variations in $I_o$ due to changes in ambient temperature, time or supply current, for example, cannot produce errors in the sensor. Second, changes in the fraction of light injected into the waveguide circuits, and changes in the loss mechanisms in the waveguide circuits cannot produce errors in the sensor, since only ratios of the circuit factors p and q remain in the sensor output. Third, the reflectance of the mirror portion of the sensor can change over time or because of other influences without producing an error, since only the ratio $R_s/R_r$ remains in the sensor output. Fourth, the gap transmittance can change without producing an error, since only the ratio $t_s/t_r$ remains in the sensor output. Thus the improvement provided by the fixed referencing method is to reduce or eliminate several sources of error inherent in the basic sensors of this class of optical displacement sensors.

Implementation of Fixed Referencing

Implementation of the fixed referencing method requires that the optical power returned in the optic circuits be manipulated to produce the quantity Q defined in Equation 4.

One way the referencing can be performed is with an electronic circuit 160 which is shown in FIG. 10. The photodetectors in this implementation are photodiodes D1 and D2 which transform the optical powers $I_s$ and $I_r$ from the optic circuits into electrical current. The current is fed to transimpedance amplifiers A1 and A2 which convert the currents to voltages which are proportional to the radiant power in the circuits. Let the overall constants of proportionality be $B_s$ for the signal circuit and $B_r$ for the reference circuit. Then the voltages from the transimpedance stages are $$V_s = B_s I_s \text{ and } V_r = B_r I_r$$

The denominator for Q is provided by passing $V_r$ through amplifier A5 which gives an adjustable gain due to the variability of R12. The denominator is then $$V'_r = \frac{R11 + R12}{R10} B_r I_r.$$

The numerator for Q requires two more stages. First the voltage from the reference channel is passed through inverting amplifier A3 where it is given an adjustable gain, since R5 is variable. This result is then added to the voltage from the signal channel by the amplifier A4 which also provides adjustable gain via R9. The result is $$V'_s = \frac{R8 + R9}{R6} B_s I_s - \frac{(R8 + R9)(R4 + R5)}{R7\,R3} B_r I_r$$

The circuit function denoted by ÷ is a divide block which forms the ratio $$Q = \frac{V'_s}{V'_r}.$$

It can be seen that this ratio is of the form required by Equation 4 with the identifications $$K = \frac{R10(R8 + R9)B_s}{R6(R11 + R12)B_r}$$

and $$G = \frac{R6(R4 + R5)B_r}{R7\,R3\,B_s}.$$

The value of G can be adjusted variable, while K is adjustable through R9.

The divide block can be implemented in several ways, among which are the following. It can consist of analog circuitry if Q is wanted as an analog signal. It can consist of a ratiometric analog-to-digital conversion if a digital rendering of Q is desired. It can be an analog-to-digital converter which converts $V_s$ and $V_r$ separately and gives the results to a microprocessor or microcomputer which forms the ratio Q in software.

The calibration procedure is the same for all possible divide blocks. First the separation between the mirror and the optic sensing end is set to its zero point. Then with R9 set near its maximum value, R5 is adjusted to make $V'_s = 0$. Next R12 is adjusted to provide whatever voltage is required for operation of the divide block. Finally the full scale displacement of the mirror relative to the optic sensing end is provided and R9 is adjusted so that the output of the divide block has the desired full scale value.

Table I gives typical values for the components in the circuit of FIG. 10.

TABLE I

| R1 = 10 MΩ | D1 = CLD42 | A1 = CA3160 | C1 = 10 pF |
|---|---|---|---|
| R2 = 10 MΩ | D2 = CLD42 | A2 = CA3160 | C2 = 10 pF |
| R3 = 33KΩ |  | A3 = CA3160 | C3 = .0047 μF |
| R4 = 15KΩ |  | A4 = CA3160 | C4 = .0047 μF |
| R5 = 50KΩ |  | A5 = CA3160 | C5 = .0047 μF |
| R6 = 33KΩ |  |  |  |
| R7 = 33KΩ | ÷ = ICL7106 |  |  |
| R8 = 33KΩ |  |  |  |
| R9 = 50KΩ |  |  |  |
| R10 = 33KΩ |  |  |  |
| R11 = 15KΩ |  |  |  |
| R12 = 50KΩ |  |  |  |

DESCRIPTION OF COMPLEMENTARY REFERENCING

A second method for eliminating or reducing errors inherent in a class of optical displacement sensors follows. This method is called complementary referencing. The method uses a second optic circuit which is employed in conjunction with the first optic circuit in such a manner that both sense the displacement to be measured and the errors due to, but not limited to, the sources mentioned above. One of the circuits will be referred to as the signal circuit while the other is called the reference circuit. The nomenclature is purely one of convenience, since there is no distinguishing difference between the two circuits. The referencing method uses the outputs of the two circuits to produce a sensor output which greatly reduces or eliminates the effects of several sources of error.

An arrangement of the optic circuits which employs the complementary referencing method in a displacement sensor of the first type is shown in FIGS. 11 and 11a. The reference optic circuit 162 is similar to the signal optic circuit 164, and they use a common light source 166. The two circuits differ in that they use opposite sides 168 or 170 of the same moving mirror 172. Clearly this arrangement is applicable only when both sides of the same mirror are accessible and have high specular reflectances. The method is especially useful when the mirror is a thin, pressure sensing elastic diaphragm. Other arrangements of the mirror are possible which take advantage of the effective compensation which stems from the anti-symmetry of the complementarily oriented mirrors. The system also includes wave guides 174 and 176 and a pair of detectors 178 and 180.

An arrangement of the optic circuits which employs the complementary referencing method of the invention in a displacement sensor of the second type shown, for example, in FIGS. 2 and 2a, is illustrated in FIG. 12. In FIG. 12, there is a pair of optical waveguide circuits 182 and 184. One branch of each of the waveguide circuits is connected to a common light source 186 while the other branch of each waveguide circuit is connected to its own photodetector 187 or 189. The pair of sensor ends 196 and 196' of each of the optical circuits is provided along a step 194 or 194' positioned between a reflective surface 190 and a pair of reflective surfaces 192 and 192' of the moveable reflective element 188. Thus, the signal circuit and the reference circuit are each mounted in proximity to a boundary between the surface 190 and the surfaces 192 and 192' so that each circuit senses the displacement of one of the steps between the surface 190 and the surfaces 192 or 192'. The difference between the two circuit deployments is that the edges of steps 194 and 194' are mutually oriented to cause the radiant power falling on the photodetectors 187 and 189 of the two circuits to change in opposite directions as the two edges are displaced (see arrow A) relative to the two optic sensing ends 196 and 196'.

Mathematical Treatment of Complementary Referencing

For both type sensors, the radiant power returned to the photodetectors 178 and 180 or 187 and 189 in each optic circuit is a modified version of Equation 3 in which the subscripts s and r refer to the signal and reference optic circuits 164 and 162 or 183 and 185, respectively. The radiant power falling on the photodetectors 178 and 180 or 187 and 189 is then $$I_s = p_s t_s R_s q_s I_o f_s(x_{os} + \delta x)$$

for the signal ciruit, while $$I_r = p_r t_r R_r q_r I_o f_r(x_{or} - \delta x)$$

for the reference circuit. Notice that the sign of $\delta x$ is different in the two circuits and represents the complementary motion of the mirror edges in the sensors.

The referencing function is performed by treating the returned radiant powers as numerical quantities and forming the ratio $$Q = K \frac{I_s - G I_r}{I_s + H I_r}. \qquad \text{Eq. 5}$$

The quantities G, H and K are adjustable parameters which are used in the following way to calibrate the sensor. Let the values of the variables at calibration be denoted with the superscript 0. Then G is set so that $Q=0$ when $\delta x=0$. G is thus a balance control which causes signal and reference channels to cancel at the zero point. This requires that $$G = \frac{p^o_s t^o_s R^o_s q^o_s f_s(x^o_{os})}{p^o_r t^o_r R^o_r q^o_r f_r(x^o_{or})}.$$

The parameter H is set at calibration so that the denominator of Q is nominally constant for the full range of sensor displacements. H is thus a control which balances the sensitivity of the two channels so that their variable parts tend to cancel each other. This requires $$H = \frac{p^o_s}{p^o_r} \frac{t^o_s}{t^o_r} \frac{q^o_s}{q^o_r} \frac{f_s(x^o_{os}) - f_s(x^o_{os} + \delta x_{max})}{f_r(x^o_{or} - \delta x_{max}) - f_r(x^o_{or})},$$

where $\delta x_{max}$ denotes the maximum value of $\delta x$ for which the sensor is calibrated. The parameter K is then set so that Q has the desired full scale value when $\delta x$ is at full scale. K thus functions as a span control for the sensor.

The result of this referencing procedure is that Q is now given $$Q = K \frac{\dfrac{p_s}{p_r} \dfrac{t_s}{t_r} \dfrac{R_s}{R_r} \dfrac{q_s}{q_r} f_s(x_{os} + \delta x) - G f_r(x_{or} - \delta x)}{\dfrac{p_s}{p_r} \dfrac{t_s}{t_r} \dfrac{R_s}{R_r} \dfrac{q_s}{q_r} f_s(x_{os} + \delta x) + H f_r(x_{or} - \delta x)}.$$

The great improvement that this referenced result represents over the unreferenced sensor can be appreciated with the following reasoning. The quantities represented by p, t, R and q can change slightly with time or with temperature or other environmental influences. These changes can be represented as a power series in the perturbing variable. For example, $$p_s = p^o_s(1 + m\Delta T + n(\Delta T)^2 + \ldots)$$

where T is temperature change relative to the temperature at the time of calibration and m and n are constants. Now $p_s$ and $p_r$ are both subject to the same form of perturbation. Moreover, the signal and reference waveguide circuits are similar with the consequence that the constants m and n (as well as the coefficients of the higher order terms in the expansion) are very closely matched. Thus there is a large useful range of temperature for which the ratio of the two power series is negligibly different from unity. This means that $p_s/p_r = p^o_s/p^o_r$. The same reasoning applies to other perturbing variables besides temperature. It also applies to the ratio of the gap transmittances $t_s/t_r$ and to the ratio of the reflectances $R_s/R_r$ and the ratio of the circuit modifying factors $q_s/q_r$. The result for Q is then $$Q = K \frac{\dfrac{p^o_s}{p^o_r} \dfrac{t^o_s}{t^o_r} \dfrac{R^o_s}{R^o_r} \dfrac{q^o_s}{q^o_r} f_s(x_{os} + \delta x) - G f_r(x_{or} - \delta x)}{\dfrac{p^o_s}{p^o_r} \dfrac{t^o_s}{t^o_r} \dfrac{R^o_s}{R^o_r} \dfrac{q^o_s}{q^o_r} f_s(x_{os} + \delta x) + H f_r(x_{or} - \delta x)}.$$

This represents the final result of the complementary referencing method. The improvement is seen to be fourfold. First, the radiant power output, $I_o$, of the light source has been removed from the sensor output. This means that variations in Io due to changes in ambient temperature, time or supply current, for example, cannot produce errors in the sensor. Second, changes in the fraction of light injected into the waveguide circuits, and changes in the loss mechanisms in the waveguide circuits cannot produce errors in the sensor, since only ratios of the circuit factors p and q remain in the sensor output. Third, the reflectance of the mirror portion of the sensor can change over time or because of other influences without producing an error, since only the ratio $R_s/R_r$ remains in the sensor output. Fourth, the gap transmittances can change without producing an error, since only the ratio $t_s/t_r$ remains in the sensor output. Thus the improvement provided by the complementary referencing method is to reduce or eliminate several sources of error inherent in the basic sensors of this class of optical displacement sensors.

The complementary referencing method has still another attribute which is frequently valuable. It has the ability to improve the linearity of the sensor to which it is applied. This ability can be seen from the form of the final result for Q. The numerator of that equation shows two similar functions, $f_s$ and $f_r$, each multiplied by a constant and then subtracted. The two optic circuits to which these functions pertain are similar and therefore generally well matched with regard to the variables p, q, t and R and with regard to the functional form for $f_s$ and $f_r$. Consequently, the numerator of the final result is the difference between the functions with each multiplied by a number not too different from unity. Now the displacement to be measured has opposite signs in the two functions so that the even parts will have opposite signs in the results, and the odd parts will have the same signs. This situation, then, means that the even parts of the two terms in the numerator will cancel or be greatly reduced, while the odd parts of the two terms will be enhanced by adding. Thus quadratic non-linearities will be substantially removed from the numerator. The denominator, on the other hand, tends to have the opposite effect: it substantially removes the odd parts from the functions $f_s$ and $f_r$ and retains the constant part and the even parts. The improvement in linearity obtained in the numerator can be shown to remain in the final result for those sensors in which the variation in the quadratic term is small with respect to the constant term. In this case the final result remains devoid of terms quadratic in $\delta x$. This linearization attribute of the complementary referencing method is particularly useful when the functions can be well described by a quadratic polynomial.

Implementation of Complementary Referencing

Implementation of the complementary referencing scheme requires that the optical power returned in the optic circuits be manipulated to produce the quantity Q defined above.

One way the referencing can be performed is with an electronic circuit 200 which is shown in FIG. 13. The photodetectors in this implementation are photodiodes D1 and D2 which transform the optical powers $I_s$ and $I_r$, from the optic circuits into electrical currents. The current is fed to transimpedance amplifiers A1 and A2 which convert the currents to voltages which are proportional to the radiant power in the circuits. Let the overall constants of proportionality be $B_s$ for the signal circuit and $B_r$ for the reference circuit. Then the voltages from the transimpedance stages are $$V_s = B_s I_s \text{ and } V_r = B_r I_r.$$

The denominator for Q is provided by passing $V_s$ and $V_r$ through the summing amplifier A5. The ratio of the gains for the two signals is set by R14 while the overall gain is set by R12. The denominator is then $$V'_r = \frac{R11 + R12}{R13 + R14} B_s I_s + \frac{R11 + R12}{R10} B_r I_r$$

The numerator for Q requires two more stages. First the voltage from the reference channel is passed through inverting amplifier A3 where it is given an adjustable gain, since R5 is variable. This result is then added to the voltage from the signal channel by the amplifier A4 which also provides adjustable gain via R8. The result is $$V'_s = \frac{R7 + R8}{R6} B_s I_s - \frac{(R7 + R8)(R4 + R5)}{R9\,R3} B_r I_r.$$

The circuit function denoted by ÷ is a divide block which forms the ratio $$Q = \frac{V'_s}{V'_r}$$

It can be seen that this ratio is of the form required by Equation 5 with the identifications $$K = \frac{(R13 + R14)(R7 + R8)}{R6\,(R11 + R12)}$$

and $$H = \frac{(R13 + R14)B_r}{R10\,B_s}$$

and $$G = \frac{R6(R4 + R5)B_r}{R9\,R3\,B_s}.$$

The value of G can be adjusted, since R5 is variable, H can be set with R14 and K is adjusted with R8.

The divide block can be implemented in several ways. It can consist of analog circuitry if Q is wanted as an analog signal. It can consist of a ratiometric analog-to-digital converter if a digital rendering of Q is desired. It can be an analog-to-digital converter which converts $V'_s$ and $V'_r$ separately and gives the results to a microprocessor or microcomputer which forms the ratio Q in software.

The calibration procedure is the same for all possible divide blocks. First the separation between the mirror and the optic sensing ends is set to the zero point. With R8 set near its maximum value, R5 is adjusted to make $V'_s = 0$. Then R12 is set near its maximum value and R14 is adjusted so that $V'_r$ does not change when the displacement is changed from its zero point to its full scale value. Next R12 is adjusted to provide whatever voltage is required for operation of the divide block. Finally the full scale displacement is provided and R8 is adjusted so that the output of the divide block has the desired full scale value.

Typical values of the circuit components are given in Table II.

TABLE II

| | | | |
|---|---|---|---|
| R1 = 10 MΩ | D1 = CLD42 | A1 = CA3160 | C1 = 10 pF |
| R2 = 10 MΩ | D2 = CLD42 | A2 = CA3160 | C2 = 10 pF |
| R3 = 33KΩ | | A3 = CA3160 | C3 = .0047 μF |
| R4 = 15KΩ | | A4 = CA3160 | C4 = .0047 μF |
| R5 = 50KΩ | | A5 = CA3160 | C5 = .0047 μF |
| R6 = 33KΩ | ÷ = ICL7106 | | |
| R7 = 33KΩ | | | |
| R8 = 50KΩ | | | |
| R9 = 33KΩ | | | |
| R10 = 66KΩ | | | |
| R11 = 15KΩ | | | |
| R12 = 50KΩ | | | |
| R13 = 33KΩ | | | |
| R14 = 100KΩ | | | |

EXAMPLE SENSORS

Examples of optic sensors employing the principles hereinbefore described with reference to FIGS. 1-13 will be described with reference to FIGS. 14-21.

Sensor of the Second Type with Fixed Referencing

Figure 15:
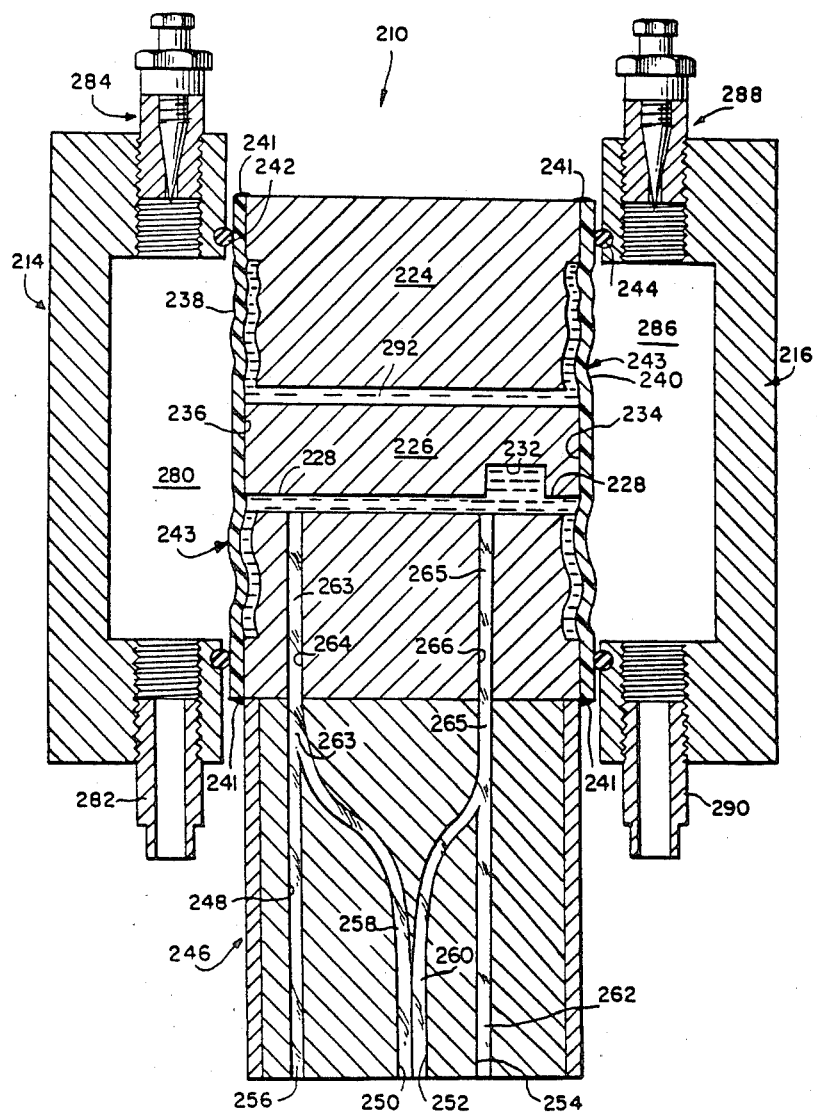
FIG. 15 is a vertical, fragmentary, sectional view of the device shown in FIG. 14.

Referring specifically to FIGS. 14 and 15, the optic sensor 210 is of the single step configuration. The sensor includes a sensor module 212 and a pair of flanges 214 and 216. The assembly also includes an electronic module housing 218 which contains the computation display printed circuit board 220 and a signal conditioning printed circuit board 222. The sensor module 212 includes a support member 224 having an opening bored therethrough into which is slideably mounted a stepped strut 226 which stepped strut has a first light-reflecting surface 228, a step generally designated 230 having a second reflecting surface 232. This stepped strut 226 is mounted with its ends 234 and 236 in engagement with a pair of flexible diaphragms 238 and 240. The pair of diaphragms are sized to extend about the diaphragm support structure 224 as more clearly illustrated in FIG. 15 of the drawing. These diaphragms are, in this form of the invention, metal and are welded as at 241 to the support element 224, as shown in FIG. 15. The end flanges 214 and 216 are sealed against their respective diaphragms by o-ring seals 242 on the one side and 244 on the opposite side.

It will be noted that the metal diaphragms 238 and 240 are provided with concentric convolutions 243 except at their edges and their centers. This permits better linearity of diaphragm motion.

The lower end of the sensor module generally designated 246 is provided with passages 248, 250, 252 and 254 which contain the optical transmitting means such as optical fibers 256, 258, 260, 262, 263 and 265.

The passages 248 and 254 communicate with the pair of passages 264 and 266 in the diaphragm support element 224 which contain the continuation of optical fibers or light paths 263 and 265. With particular reference to FIG. 15, the end of optical fiber 263 is adjacent reflecting surface 228 whereas optical fiber 265 is positioned adjacent reflecting surfaces 232 and 228 depending on the position of the stepped strut 226. Flange 214 has an internal process fluid region 280 which communicates with the diaphragm 238 and with a connector 282 which in turn is connected to a source of pressure not shown. The process fluid region 280 is also in communication with a bleed valve mechanism 284. Likewise, the other flange 216 is provided with a process fluid region 286 which is in communication with the isolating diaphragm 240 and communicates with its bleed valve assembly 288 and a nipple 290 which connects to a source of pressure not shown.

Internally of the sensor module are regions surrounding the stepped strut 226 and portions of the diaphragm support element 224 which collectively will be designated fill fluid regions 292.

Referring now more particularly to FIG. 14, optical light path or fiber 256 is in communication with a photodetector 294 carried by PC board 222; optical light paths or fibers 258 and 260 are in communication with a light source such as the light emitting diode 296 connected to the PC board 222 while optical light path 262 is in communication with photodetector 298.

The electronics for these elements and PC board 222 are not shown but could comprise, for example, the structures shown in FIG. 10 of the drawing. The PC board 220 carrying the computation display mechanism could also carry a pair of batteries 300 which might provide the source of power for the circuitry.

The distribution of sensor and computation electronics between one or more printed circuit boards is purely a matter of convenience. Likewise, the use of batteries for a power source is not mandatory. In our prototypes, most, but not all, of the FIG. 10 electronics are on board 222.

With the nipples 282 and 290 connected to pressure sources, the stepped strut 226 is caused to move either toward chamber 280 or chamber 286 depending on which of the two chambers has the greater pressure. This differential pressure is sensed by reflected light intensity variations detected by the photodetectors 294 and 298 and processed by the circuitry such as shown, for example, in FIG. 10 of the drawing.

Sensor of the First Type with Complementary Referencing

Figure 16:
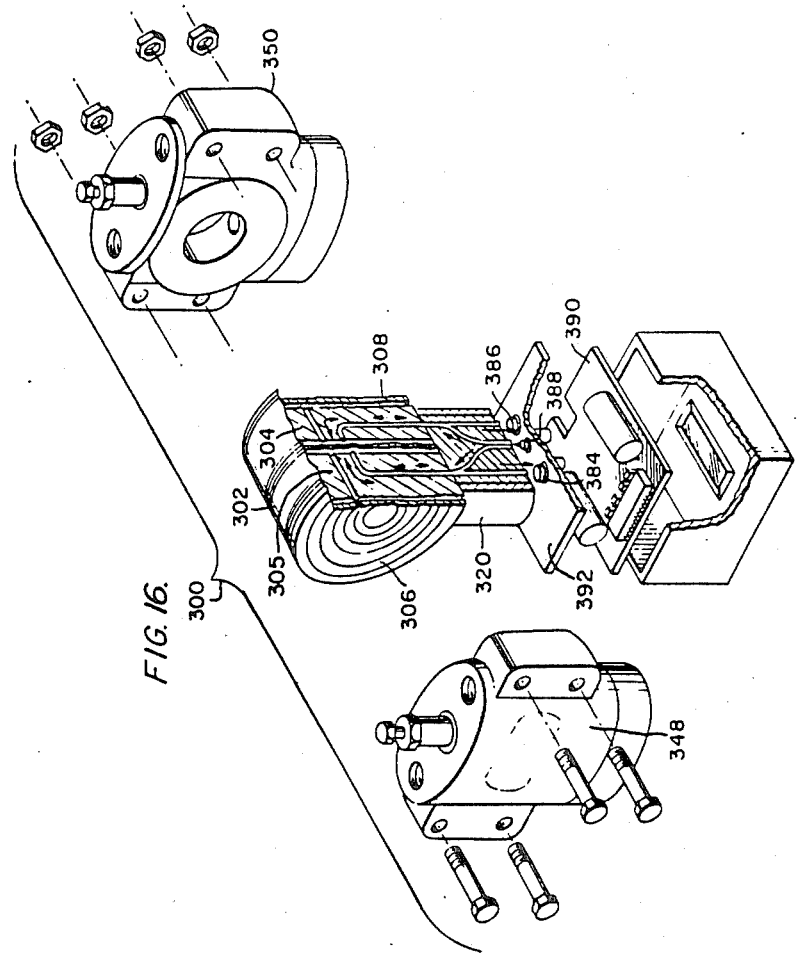
FIG. 16 is a view like FIG. 14 of a modified form of the present invention.
Figure 17:
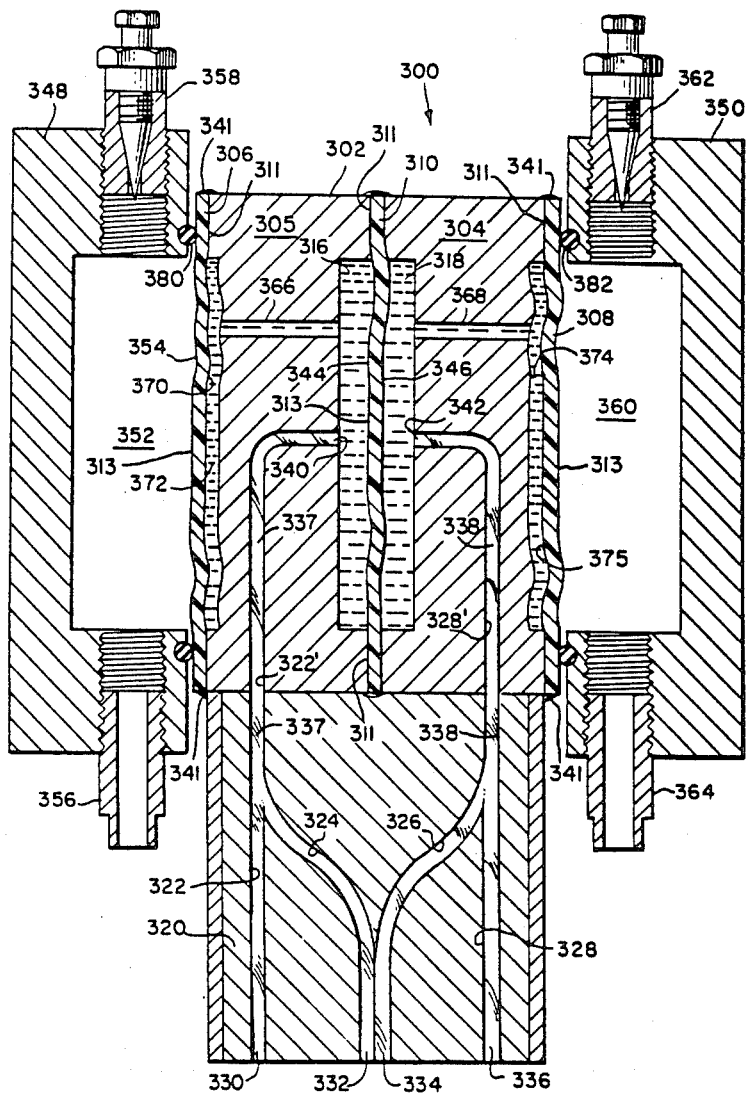
FIG. 17 is a view like FIG. 15 of the structures shown in FIG. 16.

Referring now to FIGS. 16 and 17, another example of an optic sensor generally designated 300, is illustrated.

The sensor 300 includes a sensor module 302 which includes diaphragm support elements 304 and 305, a pair of isolating diaphragms 306 and 308, and a sensing diaphragm 310. Each of the surfaces 344 and 346 of the sensing diaphragm are light reflecting and the diaphragm is positioned to provide spaces 316 and 318 for the diaphragm 310 to move when the spaces 316 and 318 are subjected to sources of fluid pressure.

The sensor module 302 is provided with a base element 320 which is provided with openings 322, 324, 326 and 328 which openings or passages receive light guides 330, 332, 334, 336, 337 and 338. The passages 322 and 328 communicate with passages 322' and 328' respectively so that the light guides 337 and 338 having end surfaces 340 and 342 terminate opposite reflecting surfaces 344 and 346 of the sensing diaphragm 310. This form of the invention is also provided with a pair of end flanges 348 and 350. Flange 348 has a chamber 352 which communicates with a portion of surface 354 of isolating diaphragm 306 and with a nipple 356 at one end, which nipple is connected to a source of fluid pressure. The chamber 352 is also provided with a bleed valve assembly 358 as in the form of the invention illustrated in FIGS. 14 and 15. Similar structures are provided in the flange 350, that is, the provision of a chamber 360, a bleed valve 362 and a nipple 364 for connecting the sensor to a source of fluid pressure.

A portion of the inner surface 370 of isolating diaphragm 306 is exposed to a chamber 372 which communicates with chamber 316 via internal passage 366. Likewise, a portion of the inner surface 375 of isolating diaphragm 308 is exposed to a chamber 374 and this chamber communicates with chamber 318 adjacent face 346 of the sensing diaphragm 310 via passage 368. Chambers 316, 318, 372 and 374 and the passages 366 and 368 are filled with a fluid which will transmit pressure differences caused by movement of the two isolating diaphragms 306 and 308 so that such movements cause movement of the sensing diaphragm 310 toward or away from, for example, flange 350. The two isolating diaphragms and the sensing diaphragm are sealed to the support elements by welds 341, and each of the three diaphragms has flat edge portions 311 and flat center portions 313. The flanges 348 and 350 are sealed to the diaphragms 306 and 308 by o-rings 380 and 382.

The assembly also includes a PC board 392 which carries a pair of photodetectors 384 and 386 and a light emitting diode light source 388. As in the prior form of the invention, the two photodetectors are in light receiving communication with light guides 330 and 336 while the light source 388 communicates with the light guides 332 and 334. As in the prior form of the invention, there is also provided a computation display printed circuit board 390. The complementary referencing electronics means are assembled primarily on board 392 which means may correspond to the circuitry 200 shown in FIG. 13 of the drawing.

In operation, when the pair of nipples 356 and 364 are connected to sources of fluid pressure, the pair of isolating diaphragms 306 and 308 are caused to move either toward or away from their respective end flanges 348 or 350. The movement of the isolating diaphragms 306 and 308 cause a change of pressure on opposite sides of the sensing diaphragm 310 thereby deflecting it and varying the light reflected from the reflecting surfaces 344 and 346 and received by the light guide ends 340 and 342, which light is detected by photodetectors 384 and 386 and processed as previously described with reference to, for example, FIGS. 11 and 11a of the drawing.

Sensor of the First Type with Fixed Referencing

Figure 18:
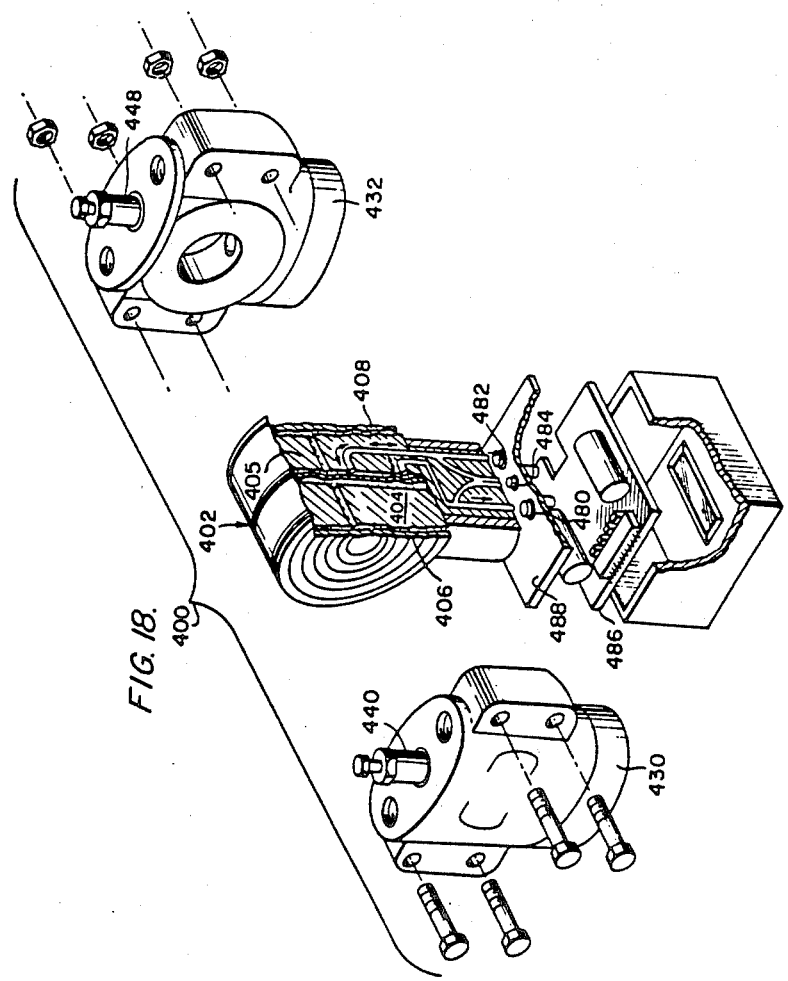
FIG. 18 is an exploded, fragmentary, perspective view of still another form of optic sensor of the invention.
Figure 19:
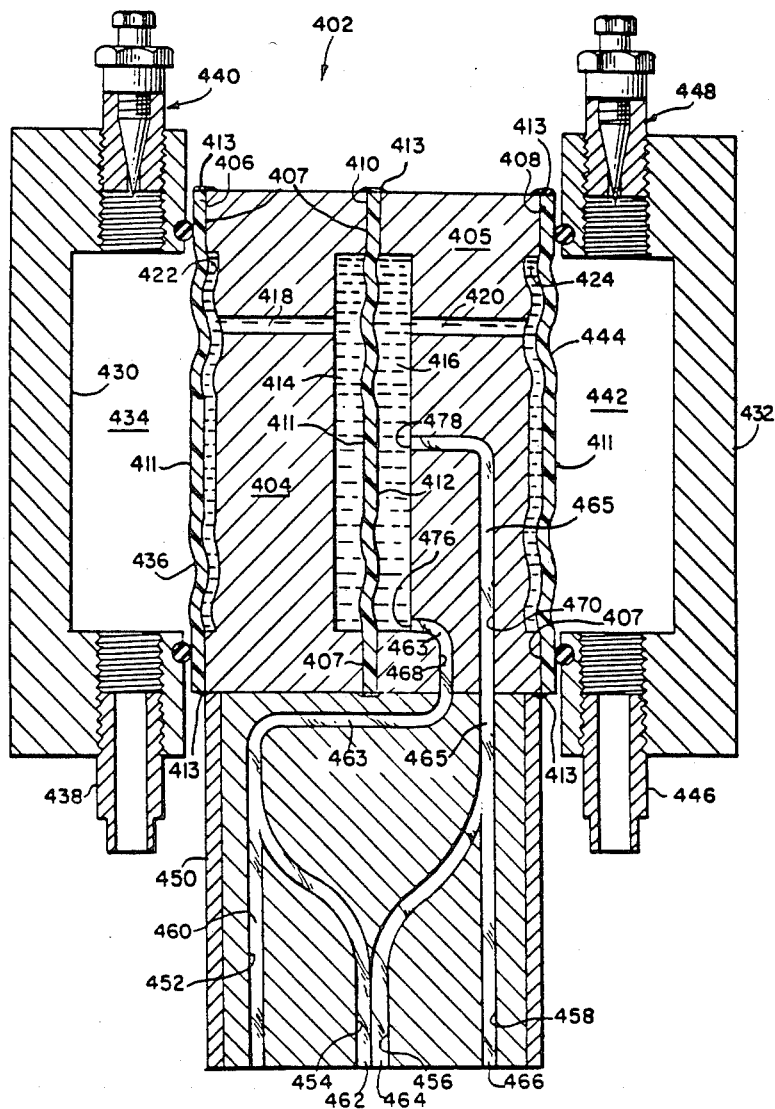
FIG. 19 is a vertical, fragmentary, sectional view of the device shown in FIG. 18.

Referring now to FIGS. 18 and 19, there is illustrated an optic sensor 400 which corresponds to the form of the invention illustrated diagrammatically in FIGS. 8 and 8a.

The sensor 400 includes a sensor module 402 having diaphragm support elements 404 and 405 to which a pair of isolating diaphragms 406 and 408 are affixed.

Between the diaphragm support elements 404 and 405 is sealed a sensing diaphragm 410 having a single reflecting surface 412. The sensing diaphragm is mounted in the support elements 404 and 405 so that opposed surfaces of the diaphragm are in communication with chambers 414 and 416. These chambers communicate via passages 418 and 420 respectively with chambers 422 and 424 which communicate with the pair of isolating diaphragms 406 and 408. The two isolating diaphragms 406 and 408 and the sensing diaphragm have flat edge portions 407 and flat center portions 411. Further, the flat edge portions are welded to support elements 404 and 405 as illustrated at 413.

Flange 430 is provided with a chamber or region 434 which region is exposed to a portion of surface 436 of diaphragm 406 and also communicates with the nipple 438 which is connected to a source of fluid pressure not shown. The flange 430 is also provided with a bleed valve assembly 440 as in the forms of the invention shown in FIGS. 14 and 15 and 16 and 17.

The flange 432 is also shaped to provide a process fluid region 442 which communicates with surface 444 of isolating diaphragm 408 and the region communicates with a nipple 446 which is connected to a source of fluid pressure not shown. Flange 432 is provided with a bleed valve assembly generally designated 448.

The sensing module 402 has at its lower end a base element 450 provided with passages 452, 454, 456 and 458 which passages receive light guides 460, 462, 464, 466, 463 and 465. Light guides 463 and 465 are continued in passages 468 and 470 in support element 405 and these light guides terminate in flat end faces 476 and 478 respectively. Light guide end face 478 is adjacent the reflecting surface 412 of sensing diaphragm 410 in a region of substantial movement, whereas end face 476 is positioned adjacent the diaphragm 410 in a region of essentially no movement.

As in the forms of the optic sensors illustrated and described with reference to FIGS. 14 and 15 and 16 and 17, the sensor 400 includes a pair of photodetectors 480 and 482, a source of light 484, and electronic circuitry mounted on PC boards 486 and 488. Portions of the electronic circuitry on PC boards 486 and 488 may take the configuration illustrated with reference to FIG. 10 of the drawing. Further as in the other forms of the optic sensors, light transmitted by fibers 460 and 466 is directed to the pair of photodetectors and the light for the waveguides is provided by the light source 484.

Sensor of the Second Type with Complementary Referencing

Figure 20:
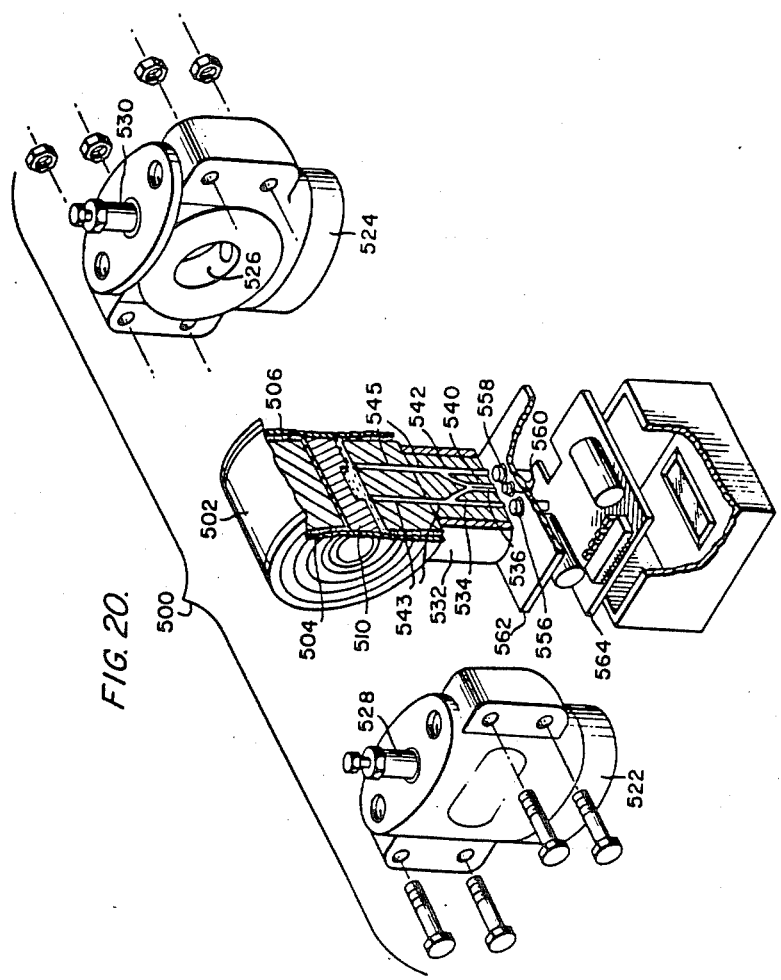
FIG. 20 is an exploded, fragmentary, perspective view of still another form of the sensor of the invention.
Figure 21:
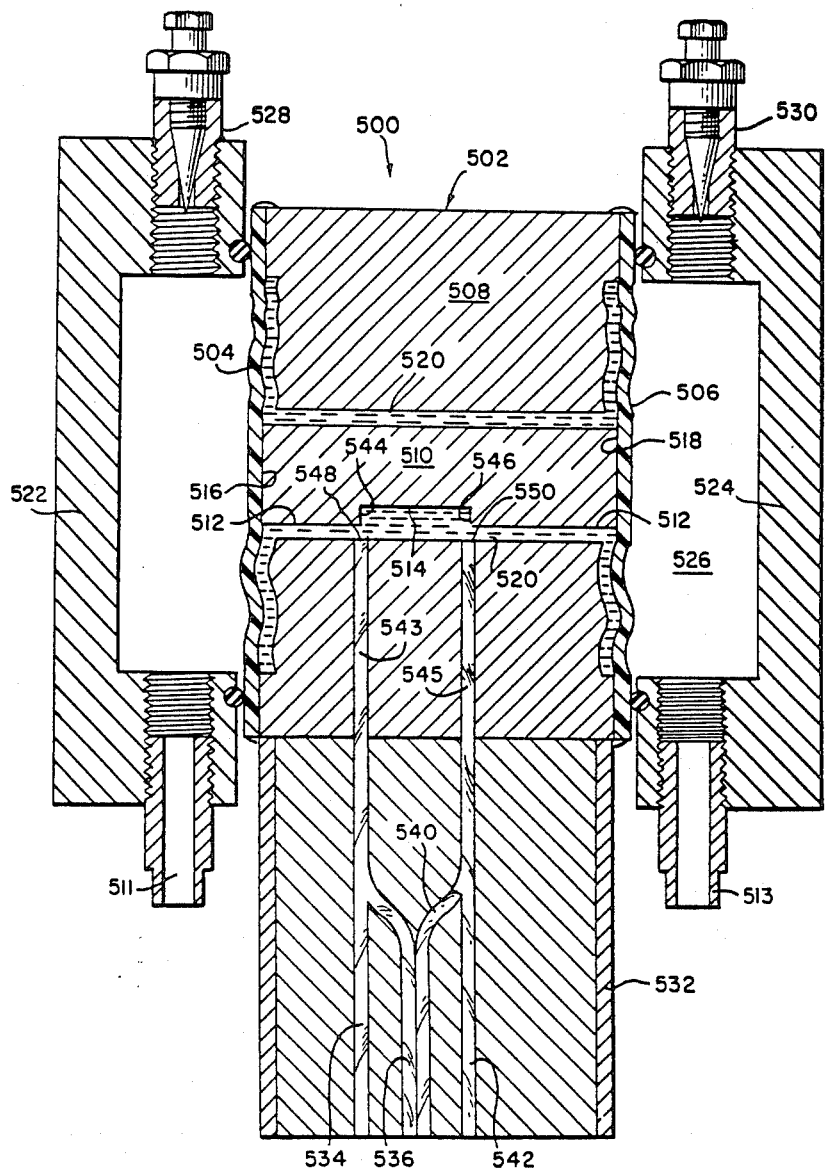
FIG. 21 is a vertical, fragmentary, sectional view of the device shown in FIG. 20.

Referring now to FIGS. 20 and 21 of the drawings, there is illustrated an optical sensor 500 of the double stepped strut type previously described with reference to the diagrammatic illustration FIG. 12 of the application drawing.

The optic sensor 500 includes a sensor module 502 comprising a pair of isolation diaphragms 504 and 506. Between the diaphragms is a diaphragm support element 508 which is provided with an opening therethrough to receive a double stepped strut 510. The double stepped strut 510 has first reflecting surfaces 512 separated by steps to a second reflective surface 514.

Diaphragms 504 and 506 are welded to ends 516 and 518 of the double stepped strut and the strut is surrounded by passages 520 in which a fill fluid is provided. Also included are a pair of flanges 522 and 524, which flanges, like in the form of the invention shown in FIGS. 14 and 15 are provided with chambers such as chamber 526 of flange 524 so that the process fluid pressure directed thereinto by nipples 511 and 513 will act on the outer surfaces of isolating diaphragms 504 and 506. The flanges are also provided with bleed valve means 528 and 530 as in the previous forms of the invention.

The base 532 of the sensor module 502 is provided with passages to receive the fiber optic light guides or equivalent 534, 536, 540, 542, 543 and 545. The light guides 543 and 545 terminate as more clearly shown in FIG. 21 adjacent each step 544 and 546 in end faces 548 and 550 to direct light toward the double stepped strut and to receive light reflected from the pair of surfaces 512 and 514. The assembly as in the previous forms of the invention includes a pair of photodetectors 556 and 558 and a source of light 560. As in the previous forms of the invention, the pair of PC boards 562 and 564 mount the photodetectors and light source and the computation electronics. Portions of the electronics may take the form shown and described with reference to FIG. 13 of the drawing.

In operation, when the pair of nipples 511 and 513 are connected to sources of fluid pressure, the pair of diaphragms 504 and 506 are caused to move either toward or away from their respective end flanges 522 or 524. The movement of the isolating diaphragms 504 and 506 moves the strut 510 from its neutral position, illustrated in FIG. 21, to thereby vary the light reflected back into the fiber optic light guides 543 and 545 as the steps 544 and 546 are shifted in position relative to the end faces 548 and 550 of the fibers 543 and 545. The differences in reflectance detected by the photodetectors 556 and 558 is processed as previously described with reference to, for example, FIG. 13 of the drawing.

We claim:

1. An optic displacement sensor comprising a light reflecting means; first and second optic circuits; and first and second optic circuits comprising bi-directional means for a light supply path to and a light return path from the said light reflecting means; wherein the first optic circuit is a reference signal circuit and the second optic circuit is a measuring signal circuit; means for directing light into the light supply paths of the said first and second optic circuits from a single light source; mounting means such that light from the light supply paths of the first and second optic circuits is received by the reflecting means and at least partially reflected into the light return paths of said first and second optic circuits; detector means for each light return path of said first and second optic circuits; and means for adjusting the measuring signal with respect to the reference signal, wherein sensing ends of the first and second optic circuits are mounted adjacent to one reflective surface of the light reflecting means; wherein the sensing end of the first optic circuit is mounted adjacent a normally immovable parallel to the light axis portion of the said reflective surface and the sensing end of the second optic circuit is mounted adjacent to a portion of the reflective surface that moves primarily parallel to the axis of light propagation at the sensing end of the second optic circuit.

* * * * *